(12) United States Patent
Shishido et al.

(10) Patent No.: US 9,562,483 B2
(45) Date of Patent: Feb. 7, 2017

(54) ENGINE INTAKE CONTROL APPARATUS

(71) Applicant: KEIHIN CORPORATION, Tokyo (JP)

(72) Inventors: Yoshikuni Shishido, Shioya-gun (JP); Masako Hagiya, Shioya-gun (JP); Yu Kumagai, Shioya-gun (JP); Yasushi Ono, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 293 days.

(21) Appl. No.: 14/206,156

(22) Filed: Mar. 12, 2014

(65) Prior Publication Data
US 2014/0261307 A1    Sep. 18, 2014

(30) Foreign Application Priority Data

Mar. 13, 2013  (JP) .................. 2013-050447

(51) Int. Cl.
F02D 41/00 (2006.01)
F02D 9/10 (2006.01)
F02D 11/10 (2006.01)
F02D 9/08 (2006.01)

(52) U.S. Cl.
CPC .......... *F02D 41/0002* (2013.01); *F02D 9/106* (2013.01); *F02D 9/108* (2013.01); *F02D 9/1035* (2013.01); *F02D 9/1065* (2013.01); *F02D 11/10* (2013.01); *Y02T 10/42* (2013.01)

(58) Field of Classification Search
CPC .. F02D 41/0002; F02D 9/1035; F02D 9/1005; F02D 9/106; F02D 9/02; F02D 11/02
USPC .......... 123/319, 337, 399, 400–403
See application file for complete search history.

(56) References Cited

U.S. PATENT DOCUMENTS

| | | | |
|---|---|---|---|
| 2005/0211215 A1* | 9/2005 | Sturdy | F02D 9/101 |
| | | | 123/184.53 |
| 2006/0137650 A1* | 6/2006 | Nakamura | F16K 1/221 |
| | | | 123/337 |
| 2009/0205611 A1* | 8/2009 | Tsugami | F02D 9/105 |
| | | | 123/399 |

FOREIGN PATENT DOCUMENTS

JP    2007-278123 A    10/2007

* cited by examiner

*Primary Examiner* — Mahmoud Gimie
(74) *Attorney, Agent, or Firm* — Westerman, Hattori, Daniels & Adrian, LLP

(57) ABSTRACT

In an engine intake control apparatus, a cover is made of synthetic resin, a motor support plate is made of metal, a positioning boss is integrally formed on the cover, a first positioning hole arranged on a motor support plate is fitted on an outer peripheral surface of the positioning boss, and the positioning boss is positioned and fitted with a throttle valve body each other. With such an engine intake control apparatus, it is possible to perform with high accuracy the mutual positioning between the three components, i.e. the motor support plate, the cover and the throttle valve body, and it is possible to effectively improve the opening and closing accuracy for the opening and closing of the throttle valve by the motor.

6 Claims, 4 Drawing Sheets

ENGINE INTAKE CONTROL APPARATUS

CROSS REFERENCES TO RELATED APPLICATIONS

The present application claims priority under 35 U.S.C. §119 to Japanese Patent Application No. 2013-50447, filed Mar. 13, 2013, entitled "Engine Intake Control Apparatus." The contents of this application are incorporated herein by reference in their entirety.

TECHNICAL FIELD

The present disclosure relates to an improvement of an engine intake control apparatus. On one side face of a throttle valve body of the intake control apparatus, a cover in which a speed reduction chamber is defined, is jointed. The throttle valve body has an intake passage which is opened and closed by a throttle valve, and supports a valve shaft of the throttle valve for opening and closing the intake passage. In the speed reduction chamber, there are accommodated: a motor, a motor support plate for supporting a stator of the motor and attached to the cover, and a reduction gear row for decelerating and transferring the rotation of a rotor shaft of the motor onto the valve shaft which is parallel with the rotor shaft.

DESCRIPTION OF THE RELATED ART

Such an engine intake control apparatus has been known as disclosed in Japanese Patent Laid-Open Publication No. 2007-278123.

SUMMARY

In such a conventional engine intake control apparatus, the motor support plate for supporting the motor is attached to the cover, and the cover is joined onto the throttle valve body. Since the mutual positioning between the motor support plate, the cover and the throttle valve body is not given special consideration, due to error accumulation in the assembling process, it is difficult to maintain properly the inter-shaft distance between a pinion gear provided on the rotor shaft of the motor, and an output gear provided on the valve shaft of the throttle valve. Therefore, the back lash of the reduction gear row is uneven, which may cause the opening and closing accuracy for the opening and closing of the throttle valve by the motor to deteriorate.

In view of the above-mentioned problems, it is preferable to provide an engine intake control apparatus which is capable of implementing with high accuracy the mutual positioning between the three components, i.e. a motor support plate, a cover and a throttle valve body, and capable of effectively improving the opening and closing accuracy for the opening and closing of a throttle valve by a motor.

In one aspect of the engine intake control apparatus of the present disclosure, on one side face of a throttle valve body, a cover in which a speed reduction chamber is defined, being jointed, the throttle valve body having an intake passage which is opened and closed by a throttle valve, and supporting a valve shaft of the throttle valve for opening and closing the intake passage, in the speed reduction chamber, there being accommodated a motor, a motor support plate for supporting a stator of the motor and attached to the cover, and a reduction gear row for decelerating and transferring rotation of a rotor shaft of the motor to the valve shaft which is parallel with the rotor shaft, the first feature of the engine intake control apparatus being in that: the cover is made of synthetic resin, the motor support plate is made of metal, there is integrally formed a positioning boss on the cover, a first positioning hole arranged on the motor support plate is fitted on an outer peripheral surface of the positioning boss, and the positioning boss is positioned and fitted with the throttle valve body each other. In addition, the motor may correspond to the stepping motor 6 in the embodiment of the present disclosure, which will be described later.

Further, in addition to the first feature, there is the second feature described below: a second positioning hole parallel to the rotor shaft is formed on the positioning boss, a positioning shaft arranged to extend in parallel with the valve shaft from the side of the throttle valve body, is fitted with the second positioning hole, the reduction gear row is constituted by a pinion gear provided on the rotor shaft, an intermediate gear block and an output gear, the intermediate gear block is constituted by a large-diameter intermediate gear engaging with the pinion gear, and a small-diameter intermediate gear which is integrally formed on one side face of the large-diameter intermediate gear, the output gear is provided on the valve shaft and engages with the small-diameter intermediate gear, and the intermediate gear block is supported by the positioning shaft.

Moreover, in addition to the second feature, there is the third feature described below: the pinion gear and the output gear are configured such that side faces of the pinion gear and the output gear face each other.

According to the first feature, the cover is made of synthetic resin, the motor support plate is made of metal, there is integrally formed a positioning boss on the cover, a first positioning hole arranged on the motor support plate is fitted on an outer peripheral surface of the positioning boss, and the positioning boss is positioned and fitted with the throttle valve body each other. Consequently, it is possible to accurately define the mutual positional relationship between the three components, i.e. the cover, the motor support plate and the throttle valve body. As a result, it is possible to obtain the inter-shaft distance of the pinion gear and the output gear as specified, and it is possible to always maintain a proper back lash of the respective parts of the reduction gear row, thereby enabling accurate opening and closing of the throttle valve by the motor. Moreover, since the motor is covered by the cover made of synthetic resin, and the motor support plate made of metal is supported by the positioning boss integrated with the cover, even if an electric leakage is produced from the electric generator on the engine side to the side of the throttle valve body, it is possible to prevent the motor from being short-circuited by the cover, thereby protecting the motor.

According to the second feature, a second positioning hole parallel to the rotor shaft is formed on the positioning boss, a positioning shaft arranged to extend in parallel with the valve shaft from the side of the throttle valve body, is fitted with the second positioning hole, the reduction gear row is constituted by a pinion gear provided on the rotor shaft, an intermediate gear block and an output gear, the intermediate gear block is constituted by a large-diameter intermediate gear engaging with the pinion gear, and a small-diameter intermediate gear which is integrally formed on one side face of the large-diameter intermediate gear, the output gear is provided on the valve shaft and engages with the small-diameter intermediate gear, and the intermediate gear block is supported by the positioning shaft. Consequently, it is possible to accurately define the mutual positional relationship between the three components, i.e. the pinion gear, the intermediate gear block and the output gear, enabling more appropriate adjustment of the back lash between the respective gears. Moreover, the positioning shaft also serves as a fulcrum shaft of the intermediate gear block, enabling positive contribution to reduction of the number of components and simplification of the structure. Further, since the positioning boss is supported by the positioning shaft and the throttle valve body which is made of metal and has high rigidity, and the positioning boss is fitted in the first positioning hole of the motor support plate, even if there is thermal expansion or contraction in the cover made of synthetic resin, the positions of the positioning shaft and the positioning boss will not change. Therefore, it is possible to always maintain an appropriate back lash between the respective gears.

According to the third feature, since the pinion gear and the output gear is configured such that the side faces of the pinion gear and the output gear face each other, it is possible to realize the compaction of the reduction gear row, thereby realizing the compaction of the cover accommodating the reduction gear row.

DESCRIPTION OF THE EMBODIMENTS

Embodiments of the present disclosure will be described below with reference to the accompanying drawings.

Figure 1:
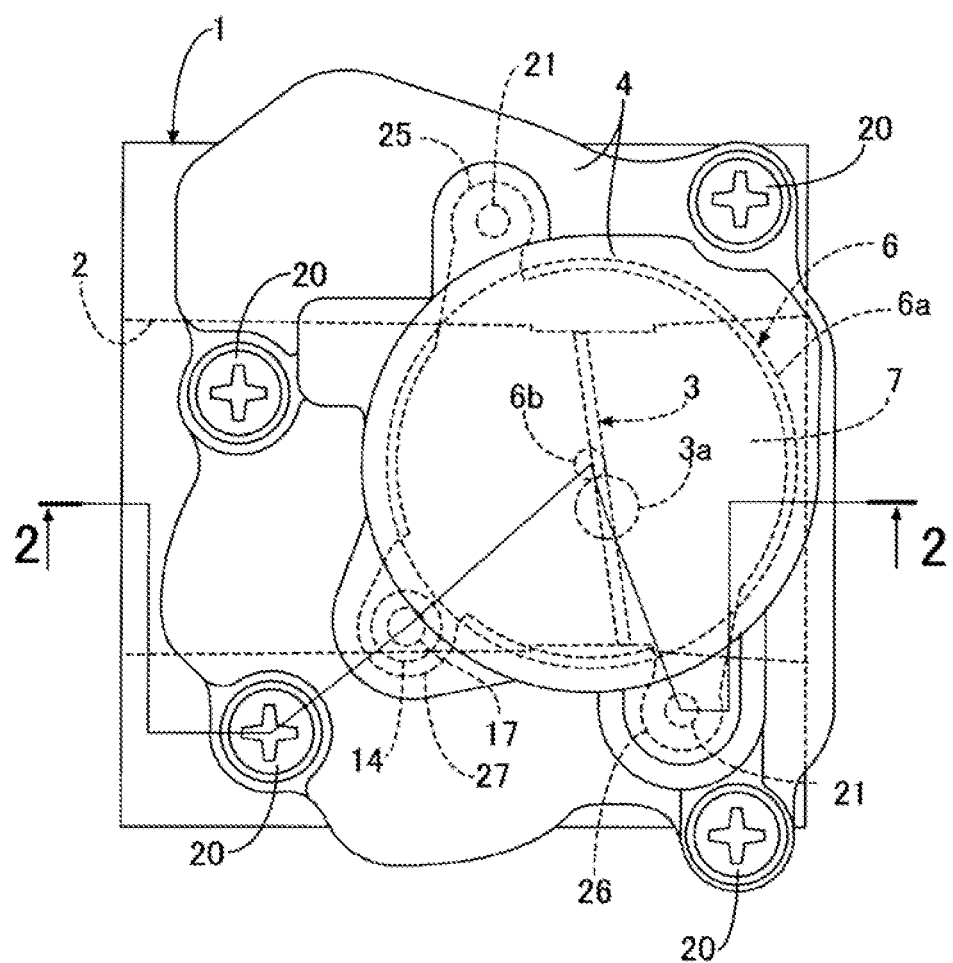
FIG. 1 is a plan view of an engine intake control apparatus according to an embodiment of the present disclosure.
Figure 2:
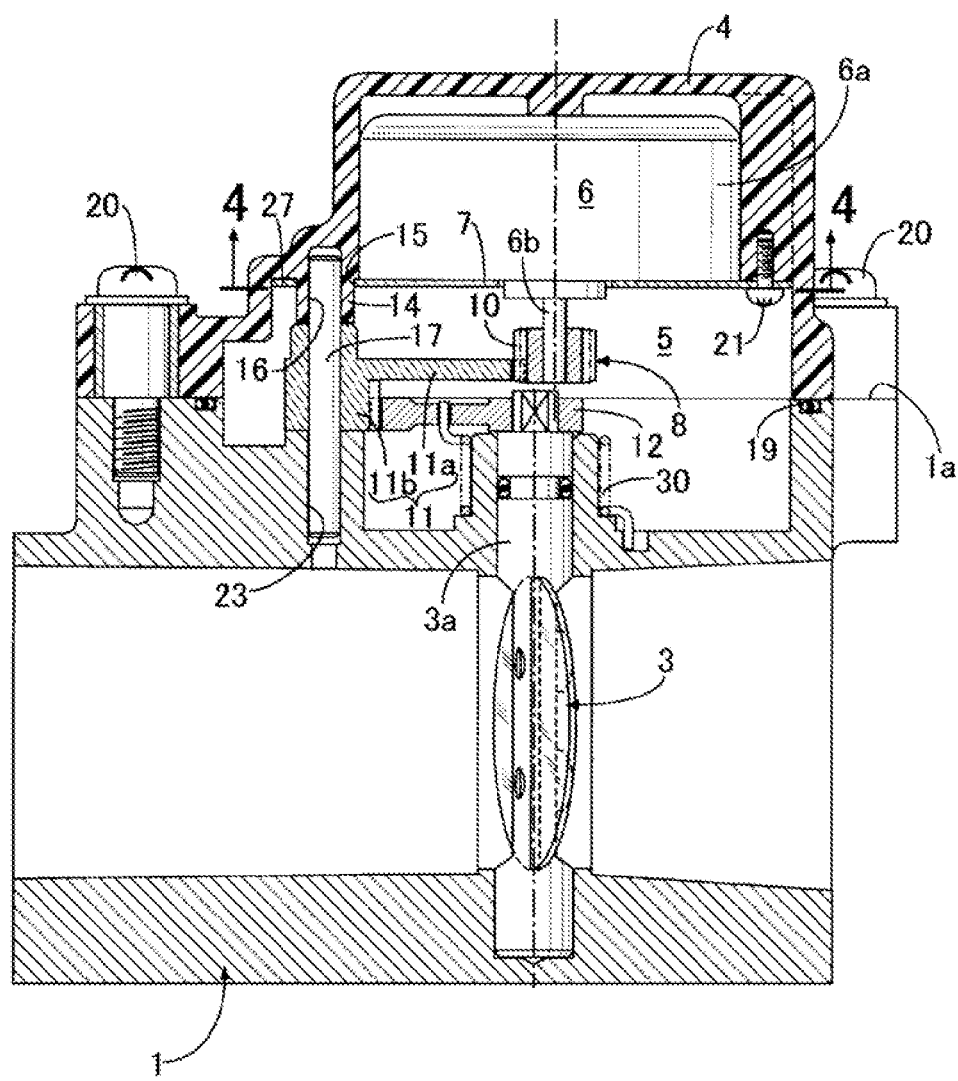
FIG. 2 is a cross-sectional view taken along Line 2-2 of FIG. 1.
Figure 3:
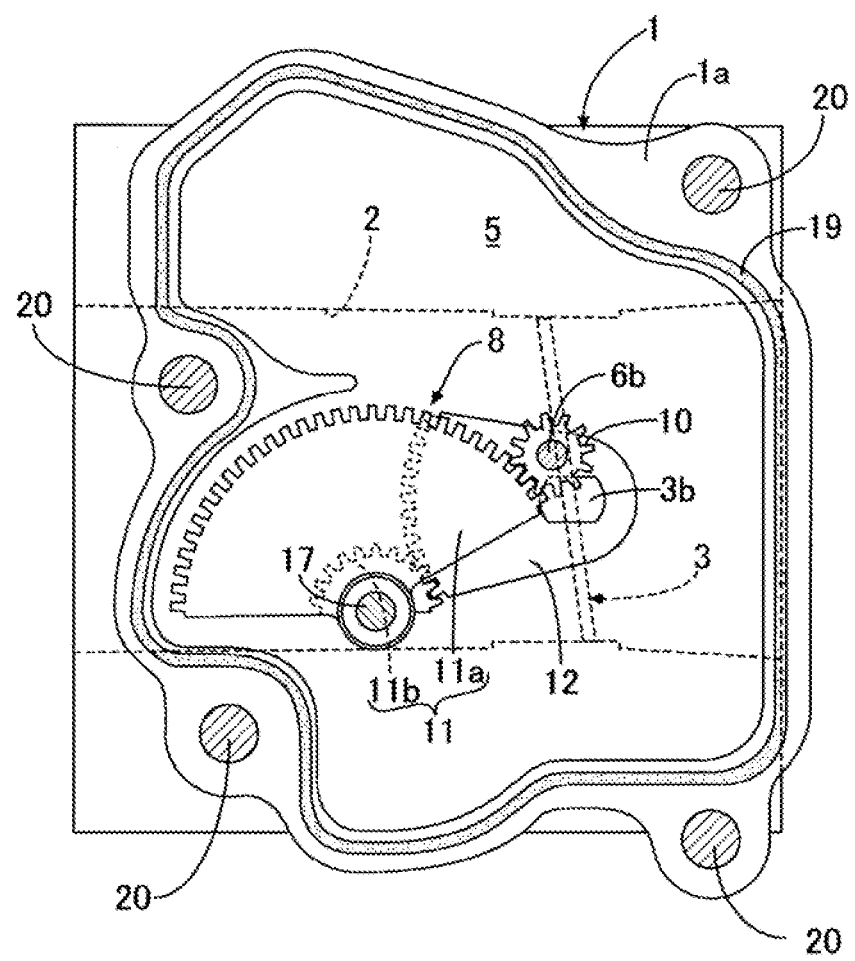
FIG. 3 is a plan view showing the above-mentioned apparatus in a state where a cover of the apparatus is removed.

In FIG. 1 to FIG. 3, a throttle valve body 1 connected with an intake system on a general-purpose engine or a vehicle engine, has an intake passage 2 connected to an intake port of the above-mentioned engine. A valve shaft 3a of a throttle valve 3 for opening and closing the intake passage 2, is rotatably supported by the throttle valve body 1.

A cover 4 made of synthetic resin is jointed, by a plurality of bolts 20, on one side face 1a of the throttle valve body 1, which is perpendicular to the axis of the valve shaft 3a, and a speed reduction chamber 5 is defined between the throttle valve body 1 and the cover 4. An O-ring 19 surrounding the speed reduction chamber 5 is mounted between the jointing surfaces of the throttle valve body 1 and the cover 4. In the speed reduction chamber 5, there are accommodated: a stepping motor 6; a motor support plate 7 made of metal which is attached to the cover 4 by a plurality of bolts 21 while supporting a stator 6a of the stepping motor 6; and a reduction gear row 8 for decelerating and transferring the rotation of a rotor shaft 6b of the stepping motor 6 onto the valve shaft 3a. The rotor shaft 6b and the valve shaft 3a are configured in parallel with each other. Further, the stator 6a is caulking joined to the motor support plate 7.

Said reduction gear row 8 is constituted by a pinion gear 10 provided on the rotor shaft 6b, an intermediate gear block 11 and a fan-shaped output gear 12, the intermediate gear block 11 is constituted by a fan-shaped large-diameter intermediate gear 11a engaging with said pinion gear 10, and a fan-shaped small-diameter intermediate gear 11b which is integrally formed on one side face of said large-diameter intermediate gear 11a, and the output gear 12 is provided on the valve shaft 3a and engages with said small-diameter intermediate gear 11b.

Figure 4:
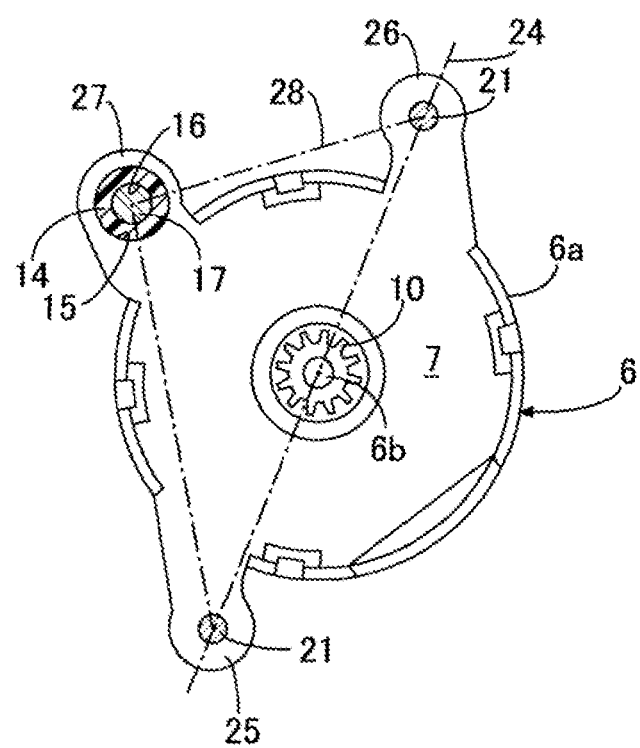
FIG. 4 is a cross-sectional view taken along Line 4-4 of FIG. 2, and shows a motor support plate in the above-mentioned apparatus.

As shown in FIG. 2 and FIG. 4, on said cover 4, there is integrally formed a positioning boss 14 which is parallel with the rotor shaft 6b and the valve shaft 3a. A first positioning hole 15 arranged on the motor support plate 7 is fitted with the outer peripheral surface of said positioning boss 14. Further, a second positioning hole 16 parallel to the rotor shaft 6b is formed in the central portion of the positioning boss 14, and a positioning shaft 17 arranged to extend in parallel with said valve shaft 3a from the side of said throttle valve body 1, is positioned and fitted in said second positioning hole 16.

The base end portion of the positioning shaft 17 is fixed by being pressed into a support hole 23 which is arranged in such a way as to penetrate the throttle valve body 1 in parallel with the valve shaft 3a, and the distal end portion of the positioning shaft 17 is fitted in the second positioning hole 16. The intermediate portion of the positioning shaft 17 is rotatably supports the intermediate gear block 11.

As shown in FIG. 4, in the outer periphery of the motor support plate 7, a pair of a first ear portion 25 and a second ear portion 26, and a third ear portion 27 are integrally arranged in a projected manner. The pair of ear portions 25 and 26 is located on a diameter line 24 passing through the center of the rotor shaft 6b. The third ear portion 27 is located at the vertex of a triangle 28. The triangle 28 has a base which is a straight line connecting between the centers of the first ear portion 25 and the second ear portion 26. The first ear portion 25 and the second ear portion 26 are attached to the cover 4 by said bolts 21. On the third ear portion 27, there is arranged the first positioning hole 15. Therefore, the third ear portion 27 is fitted in the positioning boss 14. Further, in the reduction gear row 8, the pinion gear 10 and the output gear 12 are configured such that the side faces of the pinion gear 10 and the output gear 12 face each other.

Also in FIG. 2, the reference numeral 30 is a return spring which applies a force to the output gear 12 in a direction for closing the throttle valve 3. The return spring is constituted by a torsion spiral coil.

Next, a description will be given of the operation of the embodiment.

When the throttle valve 3 is located in a specified initial position, if a acceleration operation member is operated, an electronic control unit (not shown) inputs the pulses to the stepping motor 6, the number of which corresponds to the operation amount. The stepping motor 6 performs a stepping action corresponding to the number of the input pulses. The rotor shaft 6b produces a positive rotation or a reverse rotation due to this action, and decelerates and transfers this rotation onto the valve shaft 3a via the reduction gear row 8, so that the throttle valve 3 opens by an opening degree corresponding to the pulse number. Therefore, it is possible to control the opening degree of the throttle valve 3 without detecting the opening degree of the throttle valve 3.

Further, at the time of assembly of the intake control apparatus of an engine like this, first, the first positioning hole 15 of the third ear portion 27 of the motor support plate 7 for supporting the stepping motor 6 is fitted onto the outer periphery of the positioning boss 14 of the cover 4, and the first ear portion 25 and the second ear portion 26 are attached to a specified position of the cover 4 by the bolts 21.

On the other hand, in the throttle valve body 1, the intermediate gear block 11 is installed onto the positioning shaft 17, so that the small-diameter intermediate gear 11b thereof engages with the output gear 12 provided on the valve shaft 3a.

Next, while aligning the cover 4 with one side face of the throttle valve, on which the O-ring 19 is installed, the positioning shaft 17 is fitted onto the second positioning hole 16 of the positioning boss 14, and the large-diameter intermediate gear 11a is caused to engage with the pinion gear 10 provided on the rotor shaft 6b. Thereafter, the outer peripheral portion of the cover 4 is jointed onto one side face of the throttle valve body 1 by the bolts 20.

In this way, since the first positioning hole 15 of the motor support plate 7 and the positioning shaft 17 on the side of the throttle valve body 1 are fitted on the inner and outer peripheral surfaces of the positioning boss 14 formed integrally with the cover 4, it is possible to accurately define the mutual positional relationship between the three components, i.e. the cover 4, the motor support plate 7 and the throttle valve body 1. As a result, it is possible to obtain the inter-shaft distance of the pinion gear 10 and the output gear 12 as specified, and to always maintain an appropriate back lash of the respective parts of the reduction gear row, thereby enabling accurate opening and closing of the throttle valve 3 by the stepping motor 6.

In particular, since the intermediate gear block 11 is supported by the positioning shaft 17, it is possible to accurately define the mutual positional relationship between the three components, i.e. the pinion gear 10, the intermediate gear block 11 and the output gear 12, enabling more appropriate adjustment of the back lash between the respective gears. Moreover, the positioning shaft 17 also serves as a fulcrum shaft of the intermediate gear block 11, enabling positive contribution to reduction of the number of components and simplification of the structure.

Further, in the reduction gear row 8, since the pinion gear 10 and the output gear 12 is configured such that the side faces of the pinion gear 10 and the output gear 12 face each other, it is possible to realize the compaction of the reduction gear row 8, thereby realizing the compaction of the cover 4 accommodating the reduction gear row 8.

Further, since the stepping motor 6 is covered by the cover 4 made of synthetic resin, and the motor support plate 7 made of metal is supported by the positioning boss 14 integrated with the cover 4, even if an electric leakage occurs from the electric generator on the engine side to the side of the throttle valve body 1, it is possible to prevent the stepping motor 6 from being short-circuited by the cover 4, thereby protecting the stepping motor 6.

Since the positioning boss 14 is supported by the positioning shaft 17 and the throttle valve body 1 which is made of metal and has high rigidity, and the positioning boss 14 is fitted in the first positioning hole 15 of the motor support plate 7, even if there is thermal expansion or contraction in the cover 4 made of synthetic resin, the positions of the positioning shaft 17 and the positioning boss 14 will not change. Therefore, it is possible to always maintain a proper back lash between the respective gears. The present invention is not limited to the embodiments described above, and various design alterations can be implemented within the scope not departing from the spirit thereof. For example, a motor of other forms may be adopted to replace the stepping motor.

We claim:
1. An engine intake control apparatus comprising:
a throttle valve body including an intake passage opened and closed by a throttle valve, the throttle valve body supporting a valve shaft of the throttle valve for opening and closing the intake passage;
a cover joined to one side of the throttle valve body to define a speed reduction chamber therebetween, wherein the speed reduction chamber includes:
a motor,
a motor support plate joined to the cover and supporting a stator of the motor, the stator being joined to the motor support plate, and
a reduction gear row for decelerating and transferring rotation of a rotor shaft of the motor to the valve shaft, the rotor shaft being parallel with the valve shaft,
wherein the cover is made of synthetic resin, the motor support plate is made of metal,
the cover includes a positioning boss integrally formed thereon, the positioning boss projecting from the cover toward the one side of the throttle valve body,
the motor support plate includes a first positioning hole fitted on an outer peripheral surface of the positioning boss such that the positioning boss is inserted into the first positioning hole, and
the positioning boss is positioned with respect to the throttle valve body,
wherein the engine intake control apparatus further comprises a positioning shaft extending in parallel with the valve shaft from the one side of the throttle valve body, and
wherein the positioning boss includes a second positioning hole inside thereof extending parallel with the rotor shaft and receiving the positioning shaft.
2. The engine intake control apparatus according to claim 1,
wherein the reduction gear row includes:
a pinion gear provided on the rotor shaft,
an intermediate gear block, and
an output gear,
wherein the intermediate gear block includes:
a large-diameter intermediate gear engaging with the pinion gear, and
a small-diameter intermediate gear integrally formed on one side face of the large-diameter intermediate gear,
wherein the output gear is provided on the valve shaft and engaged with the small-diameter intermediate gear, and the intermediate gear block is supported by the positioning shaft.
3. The engine intake control apparatus according to claim 2, wherein the positioning shaft is a rotational axis of the intermediate gear block.
4. The engine intake control apparatus according to claim 2, wherein one end of the positioning shaft is received by the second positioning hole and the other end of the positioning shaft is attached to the one side of the throttle valve body.
5. The engine intake control apparatus according to claim 3, wherein one end of the positioning shaft is received by the second positioning hole and the other end of the positioning shaft is attached to the one side of the throttle valve body.
6. The engine intake control apparatus according to claim 2, wherein the pinion gear and the output gear are configured such that respective side faces of the pinion gear and the output gear face each other.

* * * * *